United States Patent [19]

Nukui et al.

[11] Patent Number: 5,519,106

[45] Date of Patent: May 21, 1996

[54] PROCESS FOR THE PREPARATION OF AROMATIC POLYCARBONATE RESINS

[75] Inventors: Masahiro Nukui; Takao Tayama, both of Machida; Takeshi Kashiwagi, Yokohama; Masatoshi Kimura, Yokohama; Hidekazu Shoji, Yokohama, all of Japan

[73] Assignee: Mitsubishi Chemical Corporation, Tokyo, Japan

[21] Appl. No.: 373,034

[22] Filed: Jan. 17, 1995

Related U.S. Application Data

[63] Continuation-in-part of Ser. No. 111,455, Aug. 25, 1993, Pat. No. 5,455,324.

[30] Foreign Application Priority Data

| Aug. 26, 1992 | [JP] | Japan | 4-227278 |
| Feb. 10, 1993 | [JP] | Japan | 5-22849 |
| Apr. 2, 1993 | [JP] | Japan | 5-76959 |
| Apr. 2, 1993 | [JP] | Japan | 5-76960 |
| Jul. 16, 1993 | [JP] | Japan | 5-176871 |

[51] Int. Cl.$^6$ .................................................. C08G 64/00
[52] U.S. Cl. ........................ 528/199; 264/176.1; 526/62; 528/196; 528/167
[58] Field of Search .............................. 526/62; 528/196, 528/199, 167; 264/176.1

[56] References Cited

U.S. PATENT DOCUMENTS

| 3,410,823 | 11/1968 | Cleveland . |
| 3,492,268 | 1/1970 | Baker . |
| 3,897,392 | 7/1975 | Haupt et al. . |
| 4,383,092 | 5/1983 | Ko et al. . |
| 4,514,357 | 4/1985 | Kawaguchi et al. . |
| 4,628,081 | 12/1986 | Mark et al. . |
| 4,948,871 | 8/1990 | Fuknoka et al. . |
| 5,204,377 | 4/1993 | Fukawa et al. . |
| 5,214,073 | 5/1993 | Fukawa et al. . |

FOREIGN PATENT DOCUMENTS

| 0342696 | 11/1989 | European Pat. Off. . |
| 584801 | 3/1994 | European Pat. Off. . |
| 2164464 | 7/1972 | Germany . |
| 4038768 | 6/1991 | Germany . |
| 49-47459 | 5/1974 | Japan . |
| 49-82796 | 8/1974 | Japan . |
| 55-142025 | 11/1980 | Japan . |
| 61-151236 | 7/1986 | Japan . |
| 61-172852 | 8/1986 | Japan . |
| 62-112623 | 5/1987 | Japan . |
| 63-23926 | 2/1988 | Japan . |
| 63-223035 | 9/1988 | Japan . |
| 2-155921 | 6/1990 | Japan . |
| 2-153923 | 6/1990 | Japan . |
| 2-153924 | 6/1990 | Japan . |
| 2-153925 | 6/1990 | Japan . |
| 2-153926 | 6/1990 | Japan . |
| 2-153927 | 6/1990 | Japan . |
| 4-46928 | 2/1992 | Japan . |
| 4-72327 | 3/1992 | Japan . |
| 4-88017 | 3/1992 | Japan . |
| 4-100824 | 4/1992 | Japan . |
| 4-106124 | 4/1992 | Japan . |
| 4-106125 | 4/1992 | Japan . |
| 4-106126 | 4/1992 | Japan . |
| WO85/02622 | 6/1995 | WIPO . |

OTHER PUBLICATIONS

Database WPI, Derwent Publications, AN 80–91213C, JP–B–61 039 972, Sep. 6, 1986.

Database WPI, Derwent Publications, AN 92–213351, JP–A–4 142 329, May 15, 1992.

Patent Abstracts of Japan, vol. 17, No. 30 (C–1018), Jan. 20, 1993, JP–A–04 249 531, Sep. 4, 1992.

Polymer Degradation and Stability, vol. 14, 1986, pp. 1–22, A. Rivation, et al., "The Photo–Chemistry of Bisphenol–A Polycarbonate Reconsidered: Part 2 –FTIR Analysis of the Solid–State Photo–Chemistry in Dry Conditions".

Journal of Polymer Science, vol. 23, No. 2, Feb. 1985, pp. 343–353, CH. Bailly, et al., "Crystallization of Bisphenol–A Polycarbonate Induced by Organic Salts: Chemical Modification of the Polymer. I. Model Reactions".

N. Schnell, "Chemistry and Physics of Polycarbonates," pp. 44–51.

*Primary Examiner*—James J. Seidleck
*Assistant Examiner*—Terressa Mosley
*Attorney, Agent, or Firm*—Oblon, Spivak, McClelland, Maier & Neustadt

[57] ABSTRACT

A process for preparing an aromatic polycarbonate resin from an aromatic dihydroxy compound and a carbonate diester by transesterification in the presence of a transesterification catalyst comprising; reacting a purified carbonate diester with an aromatic dihydroxy compound in the presence of a transesterification catalyst to form a polycarbonate prepolymer; said carbonate diester containing benzophenone and benzoate ester derivatives having a molecular weight of less than 1,000, each in an amount of 100 ppm or less, said polycarbonate prepolymer having a viscosity average molecular weight of 5,000 to 20,000 at a temperature of 140° to 280° C., the reaction pressure being from 0.1 Torr to normal pressure; polymerizing said prepolymer at a temperature of 240° to 350° C. in a lateral, bi-axial, self-cleaning reactor to obtain an aromatic polycarbonate resin having a viscosity average molecular weight of 15,000 to 60,000. The aromatic polycarbonate is colorless and transparent and is suitable for extrusion molding.

13 Claims, No Drawings

PROCESS FOR THE PREPARATION OF AROMATIC POLYCARBONATE RESINS

This application is a Continuation-in-Part of application Ser. No. 08/111,455 filed Aug. 25, 1993 now U.S. Pat. No. 5,455,324.

BACKGROUND OF THE INVENTION

Field of the Invention

The present invention relates to a process for preparing an aromatic polycarbonate resin. More particularly, the invention relates to a process for preparing an aromatic polycarbonate resin with little color by transesterification.

Aromatic polycarbonate resins have been widely used as engineering plastics in many applications for which such properties of the resins as impact resistance, dimensional stability and transparency are particularly useful. Industrial methods for the preparation of the resins include phosgenation (interfacial polymerization) and transesterification (melt polymerization).

The phosgenation method is industrially widely used wherein an alkali salt of an aromatic dihydroxy compound and phosgene are reacted in a two phase system of water and methylene chloride to produce a high molecular weight polycarbonate. In this method, however, there are problems of release into the atmosphere of methylene chloride used as a solvent in a large amount and/or residual acidic materials such as halides in the polymer produced.

The transesterification method involves the reaction of a dihydroxy diaryl compound such as bisphenol with a diaryl carbonate such as diphenyl carbonate in melt state. This method may be more preferable since it is not necessary to use highly toxic phosgene and there is no environmental pollution by halogenated solvents such as methylene chloride.

However, in the preparation of a diaryl carbonate from a dialkyl carbonate by transesterification in the presence of a phenol, the resulting diaryl carbonate may be contaminated with by-products having a boiling point close to that of the diaryl carbonate, as described in, for example, Japanese Patent Application Laid-open No. 61-172852 (1986). Further, Japanese Patent Application Laid-open No. 4-100824 (1992) discloses a method for preparing an aromatic polycarbonate by melt polymerization wherein a diaryl carbonate having a xanthone content of 10 ppm or less is employed. However, there is still a problem of coloration in aromatic polycarbonates.

On the other hand, Japanese Patent Publication No. 61-39972 (1986) discloses the use of an iminocarboxylic acid or salt thereof as an transesterification catalyst. In this method, however, the polymerization reaction must be carried out at high temperatures for a long time and, accordingly, the hue of the resulting polymer is unsatisfactory.

Further, in the conventional melt polymerization for preparing polycarbonates, since the viscosity of polymer becomes very high in later stages of reaction, the reaction temperature should be increased to produce an aromatic polycarbonate with a high molecular weight, but the hue of the polymer will worsen due to thermal deterioration.

It is known that a thermal stabilizer is added to prevent molecular weight reduction and/or discoloration when polycarbonates are melt molded.

Such thermal stabilizers include various phosphate esters as shown in Japanese Patent Publication No. 37-13775 (1962) and Japanese Patent Application Laid-open No. 58-126119 (1983), N-alkylphenothiazines as shown in Japanese Patent Application Laid-open No. 49-47459 (1974), hindered phenols as shown in Japanese Patent Application Laid-open No. 61-151236 (1986), and epoxy compounds. The use of these stabilizers could improve thermal stability of aromatic polycarbonates prepared by phosgenation to a practically useful level; in aromatic polycarbonate resins prepared by melt polymerization however, these stabilizers could not always provide an aromatic polycarbonate composition with satisfactory thermal stability due to residual metal salt catalysts in the resin.

Further, it is known that the nature of the materials for the reactor may have a significant effect on the discoloration and this tendency is stronger at higher temperature.

To provide polymers with a good hue, the type of reactor used and the nature of materials used therefor have recently been investigated. For instance, attempts have been made to produce polycarbonates by utilizing various types of high-viscosity reactors for the purpose of alleviating the heat history of polymers at later stages of the reaction and/or to select the materials for the reaction vessel to prevent the discoloration.

The reactors investigated include, for example, the engaged twin-screw extruder used in Japanese Patent Publication No. 52-36159 (1977), the paddle type self-cleaning twin-screw extruders used in Japanese Patent Application Laid-open Nos. 63-23926 (1988) and 4-106124 to 106126 (1992), and the lateral mixers used in Japanese Patent Application Laid-open Nos. 2-153923 to 153927 (1990). With the use of these reactors, the polymerization temperature could be reduced to about 270° to 290° C., providing an improvement in hue as compared with the case where polymerization is effected-at high temperatures to high polymerization degrees by merely using a vessel type reactor; however, resulting polymers are inevitably colored due to the metal used for the material of the proposed reactors, which is usually stainless steel.

On the other hand, attempts have been made to select a particular material used in the reactor to prevent the discoloration. For instance, U.S. Pat. No. 4,383,092 describes that a polymer with little color can be obtained by providing a cladding or lining of Ta, Ni, Cr or any mixture thereof, or glass on the internal surface of a reactor. The coloration of polymers can also be prevented by using materials containing 85% or more of copper and/or nickel as shown in Japanese Patent Application Laid-open No. 4-72327 (1992) or materials containing 20% by weight or less of iron as shown in Japanese Patent Application Laid-open No. 4-88017 (1992) to form a reactor. However, there is a problem of higher cost of plant construction in these methods since it is necessary to use an expensive alloy instead of stainless steel as a material for forming a reactor or to provide a lining on the internal surface of a reactor.

Thus, techniques for effecting the melt polymerization process at low cost have not been established even though melt polymerization is a preferable process because there is no need to use toxic phosgene or halogenated solvent with melt polymerization.

SUMMARY OF THE INVENTION

The present inventors have made great efforts to prepare a polycarbonate resin with little color by transesterification using an industrially commonly used reactor, for example, one made of stainless steel, and finally found that a polycarbonate resin in which coloration is almost completely prevented can be provided by a process of preparing an aromatic polycarbonate resin from an aromatic dihydroxy compound and a carbonate diester by transesterification in the presence of a transesterification catalyst, comprising:

Reacting a purified carbonate diester with an aromatic dihydroxy compound in the presence of a transesterification catalyst to form a polycarbonate prepolymer; said carbonate diester containing benzophenone and benzoate ester derivatives having a molecular weight of less than 1,000, each in an amount of 100 ppm or less, said polycarbonate prepolymer having a viscosity average molecular weight of 5,000 to 20,000 at a temperature of 140° to 280° C., the reaction pressure being from 0.1 Torr to normal pressure;

polymerizing said prepolymer at a temperature of 240° to 350° C. in a lateral, bi-axial, self-cleaning reactor to obtain an aromatic polycarbonate resin having a viscosity average molecular weight of 15,000 to 60,000.

DESCRIPTION OF THE INVENTION

The present invention will be fully described hereinbelow.

Aromatic dihydroxy compounds used as starting materials in the present invention may be represented by the following formula (4):

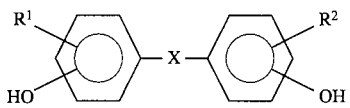

(4)

wherein each of $R^1$ and $R^2$ is independently a hydrogen or halogen atom, an alkyl or alkenyl group, or an optionally substituted aryl group; and X is a substituted methylene group represented by the following formula:

in which each of $R^3$ and $R^4$ is independently a hydrogen atom, an alkyl group having 1 to 12 carbon atoms, or an aryl group having 6 to 12 carbon atoms, or a cycloalkylene group represented by the following formula:

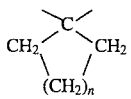

in which n is an integer of 2 to 4, or a group —O—, —CO—, —S— or —SO—.

Particularly preferred are bis(4-hydroxyphenyl)methane, 1,1-bis (4-hydroxyphenyl)ethane, 1,1-bis(4-hydroxyphenyl)propane, 2,2-bis(4-hydroxyphenyl)propane, 1,1-bis(4-hydroxyphenyl)butane, 2,2-bis(4-hydroxyphenyl)butane, 1,1-bis(4-hydroxyphenyl)pentane, 2,2-bis(4-hydroxyphenyl)pentane, 3,3-bis(4-hydroxyphenyl)pentane, 2,2 bis(4-hydroxyphenyl)-4-methylpentane, 2,2-bis(3-methyl-4-hydroxyphenyl)propane, 2,2-bis(3-ethyl-4-hydroxyphenyl)propane, 2,2-bis(3-sec-butyl-4-hydroxyphenyl)propane, 2,2-bis(3-isopropyl-4hydroxyphenyl)propane, 2,2-bis(3-phenyl-4-hydroxyphenyl)propane, 2,2-bis(4 -hydroxyphenyl)hexafluoropropane, bis(4-hydroxyphenyl)phenylmethane, 1,1-bis(4-hydroxyphenyl)-1-phenylethane, 1,1-bis(4-hydroxyphenyl)-1-phenylpropane, bis(4-hydroxyphenyl)diphenylmethane, bis(4-hydroxyphenyl)dibenzylmethane, 1,1-bis(4-hydroxyphenyl)cyclopentane, 1,1-bis(4-hydroxyphenyl)cyclohexane, 4,4'-dihydroxydiphenylether, 4,4'-dihydroxydiphenylsulfide, 4,4'dihydroxydiphenylsulfoxide, 4,4'-dihydroxydiphenylsulfone, and phenolphthalein. These aromatic dihydroxy compounds may be used alone or as any mixtures thereof.

Purified carbonate diesters used herein may include diphenyl carbonate, bis(p-chlorophenyl)carbonate, bis(o-chlorophenyl)carbonate, bis(2,4-dichlorophenyl)carbonate, bis(p-nitrophenyl)carbonate, bis(o-nitrophenyl)carbonate, bisphenol A bisaryl carbonate, and polycarbonate oligomers having a phenyl carbonate group at their terminal. Purified carbonate is preferred. Generally, these carbonate diesters may be used in an amount of 1 to 1.5 mole (preferably 1.05 to 1.15 mole, per mole of the aromatic dihydroxy compound.

Purified carbonate diesters from which benzophenone derivatives mainly responsible for coloration have been removed may be used to provide aromatic polycarbonates having a particularly improved hue.

Preferably, the amount of benzophenone derivatives in the carbonate diester used is 100 ppm or less, more preferably 10 ppm or less. If the amount of benzophenone derivatives is larger than this value, aromatic polycarbonates resulting from the transesterification are colored yellow.

Benzophenone derivatives, which can color aromatic polycarbonates, may be represented by the general formula (5):

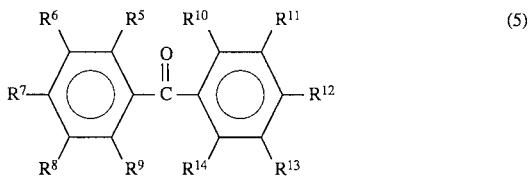

(5)

wherein each of $R^5$ to $R^{14}$ is independently a hydrogen or halogen atom, a hydroxyl, alkyl, alkenyl, optionally substituted aryl, alkoxy, alkenyloxy, or optionally substituted phenyloxy group. Illustrative examples thereof may include benzophenone, 3-methylbenzophenone, 3-vinylbenzophenone, 2,4-dimethoxybenzophonone, 4,4'-dimethoxybenzophenone, 2,2',4,4'-tetrachlorebenzophenone, 2,3,4-trihydroxybenzophenone, and 2,3,4,4'-tetrahydroxybenzophenone. Benzophenone derivatives which may affect the hue particularly significantly, i.e., which may provide a more advantageous improvement if removed, are mono- or dihydroxy-benzophenones, such as 2-hydroxybenzophenone, 3-hydroxybenzophenone, 4-hydroxybenzophenone, 2-hydroxy-4-methoxybenzophenone, 2,2'-dihydroxybenzophenone, 2,4-dihydroxybenzophenone, and 4,4'-dihydroxybenzophenone. It is particularly preferred to remove 2,2'-dihydroxybenzophenone, which may severely color aromatic polycarbonates.

It is also preferred in the invention to use purified carbonate diesters containing 100 ppm or less, preferably 10 ppm or less, of benzoate ester derivatives in order to further prevent the coloration.

Benzoate ester derivatives to be removed herein may preferably be represented by the general formula (6):

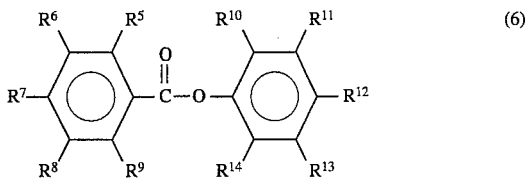

wherein $R^5$ to $R^{14}$ are as defined above.

Illustrative examples may include phenyl 2-methylbenzoate, phenyl 3-methylbenzoate, phenyl 4-methylbenzoate, phenyl 2,4-dihydroxybenzoate, 2,4-dihydroxyphenyl 2-methylbenzoate, 4-methylphenyl 2-methoxybenzoate, 4-hydroxyphenyl 2-methoxybenzoate, 4-hydroxyphenyl 2-hydroxybenzoate, 4-hydroxyphenyl 2,4-dihydroxybenzoate, and 4-hydroxyphenyl 3-hydroxybenzoate. In particular, phenyl hydroxybenzoates which may provide a more advantageous improvement it removed are phenyl 2-hydroxybenzoate (phenyl salicylate) and phenyl 4-hydroxybenzoate.

These benzophenone or benzoate ester derivatives may be dimers or trimers but should have a molecular weight less than 1,000.

In the present invention, it may also be preferred to remove any rearrangement products of carbonate diesters, other than the benzophenone and benzoate ester derivatives, from the carbonate diesters in order to further prevent the coloration of the resulting resins.

The carbonate diesters, may be prepared by any known method such as phosgenation and transesterification. The carbonate diesters may be purified to remove the benzophenone and benzoate ester derivatives to the extent of 100 ppm or less using methods of purification such as distillation, sublimation, recrystallization and active carbon treatment. Distillation is particularly preferred.

According to the present invention, a purified carbonate diester can be used to prepare an aromatic polycarbonate in which the contents of benzophenone and benzoate ester derivatives are each 100 ppm or less.

The process of the invention for preparing a polycarbonate from the aforementioned aromatic dihydroxy compound and purified carbonate diester by transesterification comprises at least two steps wherein in a first step a prepolymer having a low melt viscosity is prepared from the starting materials and the molecular weight of the resulting prepolymer is further increased in a second step.

In the first step an aromatic polycarbonate prepolymer of low molecular weight is produced from the starting materials in the presence of a transesterification catalyst. The prepolymer has little color.

Examples of transesterification catalysts include (a) an iminocarboxylic acid or salt thereof; (b) an alkali metal or alkaline earth metal compound, (c) a nitrogen containing basic compound these catalysts may be also used in the first and second processes according to the invention.

The iminocarboxylic acids used as a transesterification catalyst have a moiety represented by the general formula (7):

wherein m is an integer of 1 to 3, in the molecule. Illustrative examples thereof may include iminodicarboxylic acid compounds, such as iminodiacetic acid, iminodipropionic acid, N-methyliminodiacetic acid and phenyliminodiacetic acid; nitrilotriacetic acid compounds; such as nitrilotriacetic acid and nitrilotripropionic acid; diaminetetracarboxylic acid compounds, such as ethylenediaminetetraacetic acid, ethylenediamine-tetrapropionic acid, propylene-diaminetetraacetic acid, cyclohexanediaminetetraacetic acid, xylylenediaminetetraacetic acid and glycol ether diaminotetraacetic acid; diethylenetriaminepentaacetic acid; and trimethylenetetraminehexaacetic acid.

Salts of iminocarboxylic acids may include various metal salts of the aforementioned iminocarboxylic acids, for example, salts of alkali metals, such as lithium, sodium and potassium, alkaline earth metals, such as beryllium, magnesium, calcium and barium, and other metals, such as zinc, cadmium, copper, tin, lead, manganese cobalt and nickel.

The amount of the iminocarboxylic acid or salt thereof used is about $1 \times 10^{-6}$ to 1.0% by mole based on the total amount of the starting aromatic dihydroxy compound used. Too little amounts cannot provide a sufficient effect to catalyze the reaction or to prevent coloration. If used in much larger amounts, its effect is no longer improved and thus uneconomical.

The alkali metal or alkaline earth metal compounds include acetates, carbonates, borates, oxides, hydroxides, hydrides, phosphates and alcoholates of various metals including alkali metals such as lithium, sodium, cesium, and potassium; alkaline earth metals such as magnesium calcium and barium; and other metals such as zinc, cadmium, antimony, lead, manganese, cobalt and nickel.

The catalysts may be used in an amount based on 1 mole of the aromatic dihydroxy compound, of from $1 \times 10^{-6}$ to $1 \times 10^{-3}$ mole %.

The nitrogen containing basic component includes in the concrete tetraalkyl-, aryl- or alkarylammonium hydroxides such as tetramethylammonium hydroxide ($Me_4NOH$), tetraethylammonium hydroxide ($Et_4NOH$), tetrabutylammonium hydroxide ($B_4NOH$) and trimethylbenzylammonium hydroxide tertiary amines such as trimethylamine, triethylamine, dimethylbenzylamine and triphenylamine; secondary amines represented by $R^2NH$ (in the formula, R is alkyl such as methyl, or ethyl, or aryl such as phenyl or toluyl); primary amines represented by $RNH_2$ (in the formula, R is as defined above); or basic salts such as ammonia, tetramethylammonium borohydride ($Me_4NBH_4$), tetrabutylammonium borohydride ($Bu_4NBH_4$), tetrabutylammonium tetraphenyl borate ($Bu_4NBP_4$) and tetramethylammonium tetraphenyl borate ($Me_4NBPh_4$).

Of the basic compounds as exemplified above, particularly preferred are tetraalkylammonium hydroxides.

The nitrogen containing basic compounds are used in an amount of $10^{-6}$–1 mole % preferably $10^{-5}$–$10^{-1}$ mole % based on 1 mole of the aforementioned aromatic dihydroxy compound.

The iminocarboxylic acid or salt thereof may be used alone or, alternatively, can be combined with any other compounds known to catalyze the polycarbonate formation. Such compounds that may be used in combination with the iminocarboxylic acid or salt thereof include phenolates, carbonates, acetates, hydroxides and hydrides of alkali and alkaline earth metals; phosphorus compounds, such as phenylphosphoric acid, phenylphosphorous acid and their metal salts; organic acid catalysts, such as quinoline-5-sulfonic acid, stearyl monophenyl-phosphate and 2-N-phenylaminobenzoic acid; ammonium and phosphonium boranates, such as tetramethylammonium tetraphenylborate and tetraphenylphosphonium tetraphenylboranate; ammonium hydroxides, such as tetrabutylammonium hydroxide and trimethylbenzylammonium hydroxide; quaternary ammonium salts, such as dimethylphenylbenzylammonium chloride and benzyltributylammonium chloride; and amines and salts thereof, such as 2-methylimidazole and dimethyl-4-aminopyridine. The amount of these catalysts used in combination with the iminocarboxylic acid or salt thereof may preferably be 0.1% by mole or less based on the total amount of the aromatic dihydroxy compound used. It is not preferable to use catalysts other than the iminocarboxylic acids in a much larger amount since resulting polymers may be colored.

The first step polymerization may be effected either batchwise or continuously. In the batchwise process, the reaction may be carried out in a single vertical, vessel-type reactor having agitating blades, or in two or more vessel-type reactors arranged in parallel. In the continuous process, the reaction may be carried out in vessel-type reactors arranged in series or in a thin-film evaporator. The reaction temperature in the first polymerization step may generally be in the range of 140° to 280° C., and the pressure in the range of 0.1 Torr to normal pressure. In this first polymerization step, a polycarbonate prepolymer having a viscosity average molecular weight in the range of 5,000 to 20,000 is obtained.

The prepolymer obtained in the first polymerization step is subjected to further polymerization in a lateral, bi-axial, self-cleaning reactor. The prepolymer may be fed to this second step either directly in the melt state, or after pelletizing and blending again in an extruder or any other blender.

The lateral, bi-axial, self-cleaning reactor used in the invention may be one having two horizontal shafts rotating in the same direction and agitating blades or a helical vane attached to the shafts and rotating therewith, preferably agitating blades attached to the shafts and rotating therewith in a plane vertical to the shaft. In such a reactor, the agitating blades have different phases and rotate while holding thin spaces therebetween, so that the resins in contact with the blade surfaces are agitated without remaining thereon and the blade surfaces are replaced one by another (i.e., self-cleaning). The cross section of the agitating blades may have any shape, including but not limited to, disc, hollow disc, convex lens, stick, window frame, and pseudo-triangle shapes.

The reaction temperature in the second polymerization step is in the range of 240° to 350° C., preferably 250° to 290° C., most preferably 260° to 280° C. According to the present invention, such low temperatures may be used to produce a high molecular weight polymer while substantially preventing coloration. The pressure in this step is 10 Torr or less, preferably 2 Torr or less. Further, the lateral reactor used in the second step has a larger internal volume as compared with conventional twin-screw-type extruders and its resin-extruding performance can be controlled by the shapes and positions of the agitating blades, so that the retention time of the reaction mixture may be longer. Generally, the retention time is 5 to 90 minutes, preferably 10 to 90 minutes, more preferably 15 to 60 minutes.

The aromatic polycarbonate obtained in the second polymerization step using the lateral reactor has a viscosity average molecular weight of 15,000 or higher, preferably 20,000 to 60,000, more preferably 25,000 to 60,000. With respect to the hue of the resulting polycarbonate, for example, the "b" value as measured with Color Computer, SM-4, SUGA Test Machine K. K., Japan, is 1.5 or less, preferably 1.0 or less. In particular, the polymers obtained by the invention have a molecular weight of 25,000 or higher and a good hue and, therefore, the present invention is suitable for the preparation of polycarbonate resins for extrusion molding which require higher molecular weights.

Thus, the present invention enables the polymerization to be carried out under such mild conditions as low temperatures and short period of reaction time by employing a lateral reactor. Such conditions cannot be used with conventional reactors since neither a high degree of polymerization nor good hue of polymers can be obtained by conventional polymerization under these conditions.

In the preparation of aromatic polycarbonates according to the present invention, a monofunctional phenol can be added to modify the ends of the resulting polymers. The monofunctional phenolic compounds which can be used for this purpose may include, for example, those represented by the general formula (8):

(8)

wherein R' is an alkyl group having 1 to 30 carbon atoms, an alkoxy group having 1 to 30 carbon atoms, or an optionally substituted aryl group having 56 to 20 carbon atoms, and p is an integer of 1 to 4. Illustrative examples thereof may include cresol, methoxyphenol, tert-butylphenol, amylphenol, hexylphenol, octylphenol, cumylphenol, phenylphenol and xylenol.

In the process for preparing aromatic polycarbonates of the invention, a tri- or more polyfunctional compound, such as phloroglucin or 1,1,1,-tris(4-hydroxyphenyl)ethane, can be added to prepare a branched polycarbonate. Further, a dicarboxylic acid, such as terephthalic or isophthalic acid, may also be added to prepare an aromatic polyesterpolycarbonate resin.

The aromatic polycarbonate resin of the invention may be improved in its thermal stability by adding thereto a thermal stabilizer during its preparation or upon use thereof. Such a thermal stabilizer may include a phosphorous compound, such as a phosphate ester or a phosphite ester, or a phenolic anti-oxidant such as a hindered phenol.

Preferably, the thermal stabilizer is added during the preparation process with the most suitable timing dependent on the nature of compound used. The following three examples are most preferred.

(1) An aromatic acid phosphate ester or derivative thereof represented by the following general formula (1):

(ArO)$_n$—P(O)(OH)$_{3-n}$ (1)

wherein Ar is a phenyl or naphthyl group which may optionally have a functional group on the aromatic ring and n is 1 or 2, is added in an amount of 0.0001 to 1.0 part by weight based on 100 parts by weight of the aromatic polycarbonate resin to be produced, at any time during the preparation thereof.

(2) A phosphorous compound represented by the following formula (2):

C$_6$H$_5$—P(=O)(OH)$_2$ (2)

is added in an amount of 0.0001 to 0.01 part by weight based on 100 parts by weight of the aromatic polycarbonate resin to be produced, at any time after the molar amount of phenol distillate exceeds that of the starting carbonate diester.

(3) At least one phosphorous compound represented by the following general formula (3):

RO—PH(=O)OR' (3)

wherein R and R' independently represent an alkyl, aryl or alkylaryl group, is added in an amount of 0.001 to 0.5 parts by weight based on 100 parts by weight of the aromatic polycarbonate resin to be produced, at any time after the molar amount of phenol distillate exceeds that of the starting carbonate diester.

The aromatic acid phosphate ester represented by the general formula (1) may be monoester, diester or mixture thereof and illustrative examples thereof may include phenyl acid phosphate, tolyl acid phosphate, (tert-butylphenyl) acid phosphate and naphthyl acid phosphate. These compounds may be used alone or two or more of them may be used together.

These aromatic acid phosphate esters may be used as such or in the form of their derivatives; for example, a part or whole of them may be salts of alkali or alkaline earth metals or amines. Further, the aromatic acid phosphate esters may have two or more phosphorus atoms in the molecule.

The amount of aromatic acid phosphate ester added is 0.0001 to 1.0% by weight, preferably 0.001 to 1.0% by weight, more preferably 0.01 to 0.1% by weight, based on the aromatic polycarbonate resin. Smaller amounts than 0.0001% by weight are insufficient to exhibit the thermal stabilizing effect. With amounts larger than 1.0% by weight, the thermal stabilizing effect is no longer increased and the hydrolytic resistance of the resin may be adversely affected.

The amount of the phosphorus compound represented by the formula (2) added is preferably 0.0001 to 0.01 part by weight based on 100 parts by weight of the aromatic polycarbonate resin to be produced. If the amount is smaller than 0.0001 part by weight, the molecular weight reduction of the resin and the coloration due to decomposition of the resin cannot be prevented. With amounts larger than 0.01 part by weight, the hydrolytic resistance of the resin may be adversely affected, or the transesterification or polymerization does not sufficiently proceed, or it will be difficult to achieve higher degrees of polymerization.

The phosphorus compound represented by the general formula (3) may be either an alkyl or aryl ester, with an aryl ester being preferred because of higher effect. Illustrative examples thereof may include diphenyl hydrogenphosphite (diphenyl phosphite), ditolyl hydrogenphosphite, bis-(nonylphenyl) hydrogenphosphite, bis(p-tert-butylphenyl) hydrogenphosphite, bis(p-hexylphenyl) hydrogen-phosphite, dicresyl phosphite, di-2-ethylhexyl hydrogenphosphite, dilauryl hydrogenphosphite, dioleyl hydrogenphosphite and stearyl hydrogenphosphite. In particular, diphenyl hydrogenphosphite and bis(nonylphenyl) hydrogenphosphite are preferably used.

The amount of the phosphorous compound added is 0.001 to 0.5 parts by weight, preferably 0,003 to 0.1 part by weight, based on 0.100 parts by weight of the polycarbonate resin. With smaller amounts than this range, the molecular weight reduction of the resin and the coloration due to decomposition of the resin cannot be prevented. If the amounts are larger than 0.5 parts by weight, the hydrolytic resistance of the resin may be adversely affected.

These phosphoric compounds may be used alone or as any mixture of two or more thereof.

If desired, any other known thermal stabilizer may also be added in the present invention. Such a thermal stabilizer which may be used in combination with the aforementioned phosphorous compound represented by the formulae (1) to (3) includes a phosphorous thermal stabilizer, such as a phosphite triester, benzenephosphonic acid or an acid phosphate ester, or an anti-oxidant, such as a hindered phenol.

The aromatic polycarbonate resins of the invention may be modified with other resin(s), if desired. Further, conventional additives, including fillers such as glass and carbon fiber, flame retardants, UV absorbers, mold-releasing agents and coloring agents, may also be added, if desired.

According to the present invention, aromatic polycarbonate resins having an excellent hue and a high quality can be obtained without residual methylene chloride. Accordingly, they may be very advantageous industrially and generally useful as engineering plastic materials for wide applications, including sheets, optical parts, such as lens, compact discs and optical discs, transparent parts for automobiles, and housings for various instruments and equipment.

EXAMPLES

The present invention will be illustrated by the following examples which do not limit the scope of the invention.

The procedures used to measure the properties or parameters in these examples are as follows:

1. Viscosity average molecular weight (Mv):

An intrinsic viscosity [η] in the methylene chloride at 20° C. (dl/g) was measured with an Ubbellohde viscometer and a viscosity average molecular weight was calculated from the equation:

$$[\eta]=1.23\times10^{-4} (Mv)^{0.83}$$

2. Hue of polymer:

A hue of a pellet was evaluated by "b" value as measured by reflection with a color computer made by SUGA Test Machine K. K., Japan, SM Color Computer; Model SM-4. The higher the "b" value, the higher the yellowness. A sample with a good hue has a "b" value of 1.5 or lower, preferably 1.0 or lower.

3. Thermal stability:

A polymer was dried in a vacuum drier at 120° C. for 6 hours or more and compression molded in a press at 280° C. for 6 minutes to yield a sheet. The thermal stability was estimated by percent retention of molecular weight between before and after the compression molding. A sample with good thermal stability has a molecular weight retention of 90% or more, preferably 95% or more.

4. Hydrolytic resistance:

A sheet obtained in the same manner as described above was treated in a pressure cooker test (PCT) machine at 120° C. for 12 hours. The hydrolytic resistance was estimated by percent retention of molecular weight between before and after the PCT treatment. A sample with good hydrolytic resistance has a molecular weight retention of 90% or more, preferably 95% or more.

5. Contents of benzophenone and benzoate ester derivatives:

These values were measured by high performance liquid chromatography (HPLC).

Example 1

Eighty (80) kg of diphenyl carbonate was agitated under nitrogen stream at 100° C. for one hour to melt and the temperature was raised to about 142° C. Then, the pressure was reduced to 3 Torr and the diphenyl carbonate purified by distillation. The distillation temperature at 3 Torr was varied to control the respective amounts of 2,2'-dihydroxybenzophenone and phenyl-2-hydroxybenzoate removed from the diphenyl carbonate.

A purified diphenyl carbonate obtained with a yield of 95% contains 60 ppm of 2,2'-dihydroxybenzophenone and 60 ppm of phenyl 2-hydroxybenzoate.

Into a 30 liter vessel-type reactor, there were charged 4,566 g (20.0 mol) of bisphenol A, 4,584 g (21.4 mol) of the purified diphenyl carbonate containing 60 ppm of 2,2'-dihydroxybenzophenone and 60 ppm of phenyl 2-hydroxybenzoate, and 0.028 g (0.0001 mol) of trisodium nitrilotriacetate monohydrate. After substitution with nitrogen, the temperature was gradually raised. Once the reaction mixture was dissolved, agitation was started to initiate the polymerization. At this time he temperature in the vessel was 180° C. Thereafter, the temperature was further raised to 270° C. while the pressure was gradually reduced. The reaction was continued while the produced phenol was distilled out. Finally, the pressure in the vessel was held at 1 Torr. The total period of time for polymerization was 4 hours. Thus, a prepolymer having a viscosity average molecular weight of 15,500 was obtained. After the vessel was restored to normal pressure, the prepolymer was extruded into a water bath and the extruded strands were cut into pellets.

The prepolymer was then made molten in an extruder at 280° C. and transferred to a lateral, bi-axial, self-cleaning reactor made of stainless steel (internal volume of 2 liter, reaction temperature of 280° C., vacuum of 0.2 Torr, number of revolution of 70 rpm). The molten polymer was drawn with a gear pump at a rate of 1.8 kg/h. The retention time was 30 minutes. The polymer obtained had a viscosity average molecular weight of 26,600 and was substantially colorless and transparent corresponding to a hue of "b" value of 0.50.

Example 2

The procedures of Example 1 were repeated except that the retention time in the lateral, bi-axial, self-cleaning reactor was 20 minutes. The polymer obtained had a viscosity average molecular weight of 20,600 and a hue or "b" value of 0.50.

Example 3

The procedures of Example 1 were repeated except that the amount of trisodium nitriloacetate monohydrate used as the catalyst was 0.28 g (0.001 mol). The polymer obtained had a viscosity average molecular weight of 29,600 and a hue of "b" value of 0.50.

Example 4

The procedures of Example 1 were repeated except that the catalyst used was 0.37 g (0,001 mol) of disodium ethylenediaminetetraacetate dihydrate instead of trisodium nitrilotriacetate monohydrate. The polymer obtained had a viscosity average molecular weight of 28,700 and was substantially colorless corresponding to a "b" value of 0.70.

Example 5

The procedure of Example 1 were repeated except that the catalyst used was 0.32 g (0.001 mol) of dilithium ethylenediaminetetraacetate monohydrate instead of trisodium nitrilotriacetate monohydrate. The polymer obtained had a viscosity average molecular weight of 27,900 and was substantially colorless corresponding to a "b" value of 0.50.

Example 6

Eighty (80) kg of diphenyl carbonate was agitated under nitrogen stream at 100° C. for one hour to melt and the temperature was raised to 141° C. Then, while that temperature was exactly maintained, the diphenyl carbonate was purified by distillation under a reduced pressure of 3 Torr. The contents of 2,2'-dihydroxybenzophenone and phenyl 2-hydroxybenzoate were 10 ppm and 60 ppm, respectively.

Into a 3 liter vessel-type reactor, there were charged 457 g (2 mol) of bisphenol A, 458 g (2.14 mol) of the purified diphenyl carbonate containing 10 ppm of 2,2'-dihydroxybenzophenone and 60 ppm of phenyl 2-hydroxybenzoate, and 0.0028 g (0.00001 mol) of trisodium nitrilotriacetate monohydrate. After substitution with nitrogen, the temperature was gradually raised. Once the reaction mixture was dissolved, agitation was started to initiate the polymerization. At this time the temperature in the vessel was 180° C. Thereafter, the temperature was further raised to 270° C. while the pressure was gradually reduced. The reaction was continued while the produced phenol was distilled out. Finally, the pressure in the vessel was held at 1 Torr. The total period of time for polymerization was 4 hours. Thus, a prepolymer having a viscosity average molecular weight of 15,500 was obtained. After the vessel was restored to normal pressure, the prepolymer was extruded into a water bath and the extruded strands were cut into pellets.

The prepolymer was then melted in an extruder at 280° C. and transferred to a lateral, bi-axial, self-cleaning reactor (2 liter, 280° C., 0.2 Torr, 60 rpm). The molten polymer was drawn out with a gear pump at a rate of 1.8 kg/h. The retention time was 30 minutes. The polymer obtained had a viscosity average molecule weight of 26,600 and was substantially colorless and transparent corresponding to a hue or "b" value of 0.40.

Comparative Example 1

Eighty (80) kg of diphenyl carbonate was agitated under nitrogen stream at 100° C. for one hour to melt and the temperature was raised to 146° C. Then, the diphenyl carbonate was purified by distillation at 146° C. under a reduced pressure of 3 Torr. The contents of 2,2'-dihydroxybenzophenone and phenyl 2-hydroxybenzoate contained in the purified diphenyl carbonate were measured. The contents of 2,2'-dihydroxybenzophenone and phenyl 2-hydroxybenzoate were 200 ppm and 60 ppm, respectively.

Into a 3 liter reactor made of stainless steel and equipped with an agitator were introduced 456 g of 2,2-bis(4-hydroxyphenyl)propane, 470 g of the diphenyl carbonate which contains 200 ppm of 2,2'-dihydroxybenzophenone and 60 ppm of phenyl 2-hydroxybenzoate, 25.6 mg of trisodium nitrilotriacetate and 8 mg of calcium acetate, and the mixture was melted under nitrogen stream at 190° C. The melted mixture was subjected to polycondensation at 190° C. and 50 mmHg for 1.5 hours, and then at 210° C. and 50 mmHg for 1.5 hours while the liberated phenol was distilled out. Thereafter, the temperature was further raised to 300° C. over 2 hours and the pressure was reduced to 0.5 mmHg over 1.5 hours to further distill the phenol. The polycondensation reaction was continued at 300° C. and 0.5 mmHg for 2.5 hours.

The polycondensate resin thus obtained had a viscosity average molecular weight of 22,600 and a "b" value of 6.50.

Comparative Example 2

Measuring the contents of 2,2'-dihydroxybenzophenone and phenyl 2-hydroxybenzoate in a diphenyl carbonate produced by Enichem Corporation, Italy.

Ten (10) percent by weight solution of a diphenyl carbonate from Enichem in acetonitrile was analyzed by a high performance liquid chromatography (SHIMADZU LC-6A). As an eluent, a mixture of acetonitrile/water (7/3) was used.

The results were as follows:

2,2'-dihydroxybenzophenone . . . 300 ppm phenyl 2-hydroxybenzoate . . . 200 ppm.

The procedures of Comparative Example 1 were repeated except that the commercially available diphenyl carbonate produced by Enichem Corporation and having a 2,2'-dihydroxybenzophenone content of 300 ppm and a phenyl 2-hydroxybenzoate content of 200 ppm, as diphenyl carbonate, was used in an amount of 470 g. The resulting polycarbonate resin had a viscosity average molecular weight of 23,200 and a "b" value of 7.50.

Example 7

The procedures of Example 6 were repeated except that the retention time in the lateral, bi-axial, self-cleaning reactor was 20 minutes. The polymer obtained had a viscosity average molecular weight of 20,600 and a hue or "b" value of 0.40.

Example 8

The procedures of Example 6 were repeated except that the amount of trisodium nitrilotriacetate monohydrate used as the catalyst was 0.28 g (0.001 mol). The polymer obtained had a viscosity average molecular weight of 29,600 and a hue or "b" value of 0.40.

Example 9

The procedures of Example 6 were repeated except that the catalyst used was 0.37 g (0.001 mol) of disodium ethylenediaminetetraacetate dihydrate. The polymer obtained had a viscosity average molecular weight of 28,700 and was substantially colorless corresponding to a "b" value of 0.50.

Example 10

The procedures of Example 6 were repeated except that the catalyst used was 0.32 g (0.001 mol) of dilithium ethylenediaminetetraacetate monohydrate. The polymer obtained had a viscosity average molecular weight of 27,900 and was substantially colorless corresponding to a "b" value of 0.40.

Example 11

The procedures of Example 6 were repeated except that the catalyst used was 0.22 g (0.001 mol) of trilithium nitrilotriacetate monohydrate. The polymer obtained had a viscosity average molecular weight of 28,700 and was substantially colorless corresponding to a "b" value of 0.20.

Comparative Example 3

The procedures of Example 6 were repeated except that the diphenyl carbonate used contained 200 ppm of 2,2'-dihydroxybenzophenone and 60 ppm of phenyl 2-hydroxybenzoate. The polymer obtained had a viscosity average molecular weight of 23,600 and was yellowish corresponding to a hue of "b" value of 6.20.

Example 12

Into a 30 liter vessel-type reactor, there was charged 4,566 g (20.0 mol) of bisphenol A, 4,584 g (21.4 mol) of purified diphenyl carbonate containing 60 ppm or 2,2'-dihydroxybenzophenone and 60 ppm of phenyl 2-hydroxybenzoate, and 5.0 ml of an aqueous solution (0.02 mol/l) of trilithium nitriloacetate (100 μmol). After substitution with nitrogen, the temperature was gradually raised. Once the reaction mixture was dissolved, agitation was started to initiate the polymerization. At this time the temperature in the vessel was 180° C. Thereafter, the temperature was further raised to 270° C. while the pressure was gradually reduced. The reaction was continued while the produced phenol was distilled out. Finally, the pressure in the vessel was held at 0.2 Torr. The total period of time for polymerization was 4 hours. Thus, a prepolymer having a viscosity average molecular weight of 15,500 was obtained. The amount of phenol distilled out during the polymerization was 3,730 g (39.68 mol). After the vessel was restored to normal pressure, the prepolymer was extruded into a water bath and the extruded strands were cut into pellets.

To 100 parts by weight of the prepolymer, 0,003 parts by weight of diphenyl phosphite was added. The mixture was then molten in a twin-screw extruder at 270° C. and transferred to a lateral, bi-axial, self-cleaning high-viscosity reactor (2 liter, 270° C., 0.2 Torr, 60 rpm). The molten polymer was drawn out with a gear pump at a rate of 1.8 kg/h. The retention time was 30 minutes. The polymer obtained had a viscosity average molecular weight of 25,800 and was substantially colorless and transparent. The polymer was subjected to the thermal stability and hydrolytic resistance tests and the results are shown in Table 1.

Example 13

The procedures of Example 12 were repeated except that the amount of diphenyl phosphite added was 0.01 parts by weight based on 100 parts by weight of the prepolymer. The polymer obtained had a viscosity average molecular weight of 25,200 and was colorless and transparent. The polymer was subjected to the thermal stability and hydrolytic-resistance tests and the results are shown in Table 1.

Example 14

The procedures of Example 12 were repeated except that the diphenyl phosphite was replaced with 0.05 parts by weight of bis(nonylphenyl) hydrogenphosphite based on 100 parts by weight of the prepolymer. The polymer obtained had a viscosity average molecular weight of 24,200 and was colorless and transparent. The test results of the polymer obtained are shown in Table 1.

Example 15

Into a 30 liter vessel-type reactor, there were charged 4,566 g (20.0 mol) of bisphenol A, 4,584 g (21.4 mol) of purified diphenyl carbonate as used in Example 12, and an aqueous solution (0.02 mol/l) of trilithium nitrilotriacetate. After substitution with nitrogen, the temperature was gradually raised. Once the reaction mixture was dissolved, agitation was started to initiate the polymerization. At this time the temperature in the vessel was 180° C. Thereafter, the temperature was further raised to 270° C. while the pressure was gradually reduced. The reaction was continued while the produced phenol was distilled out. Finally, the pressure in the vessel was held at 0.2 Torr. The total period of time for polymerization was 4 hours. Thus, a prepolymer having a viscosity average molecular weight of 15,100 was obtained. The amount of phenol distilled out during the polymerization was 3,900 g (41.5 mol). After the vessel restored to normal pressure, the prepolymer was extruded into a water bath and the extruded strands were cut into pellets.

To 100 parts by weight of the prepolymer, 0.003 parts by weight of phenylphosphonic acid was added. The mixture was then melted in a twin-screw extruder at 270° C. and transferred to a lateral, bi-axial, self-cleaning high-viscosity reactor (2, liter, 270° C., 0.2 Torr, 60 rpm). The molten polymer was drawn out with a gear pump at a rate of 1.8 kg/h. The retention time was 30 minutes. The polymer obtained was substantially colorless and transparent and had a viscosity average molecular weight of 26,800. The polymer was objected to the thermal stability and hydrolytic resistance tests and the results are shown in Table 1.

Example 16

The procedures of Example 15 were repeated except that the amount of phenylphosphonic acid added was 0.01 part by weight based on 100 parts by weight of the prepolymer. The polymer obtained was colorless and transparent and had a viscosity average molecular weight of 26,500. The test results of the polymer are shown in Table 1.

Example 17

The procedures of Example 15 were repeated except that the phenylphosphonic acid was replaced with 0.03 parts by weight of diphenyl phosphate based on 100 parts by weight of the prepolymer. The polymer obtained was colorless and transparent and had a viscosity average molecular weight of 25,000. The polymer was subjected to the thermal stability and hydrolytic resistance tests and the results are shown in Table 1.

Example 18

The procedures of Example 15 were repeated except that the amount of diphenyl phosphates added was 0.09 part by weight based on 100 parts by weight of the prepolymer. The polymer obtained was colorless and transparent and had a viscosity average molecular weight of 25,900. The test results of the polymer are shown in Table 1.

TABLE 1

| | My After | | | My Retention | | |
|---|---|---|---|---|---|---|
| | Polymerization | Press | PCT | Press | PCT | "b" |
| Ex. 12 | 25800 | 25100 | 24800 | 97 | 99 | 0.30 |
| Ex. 13 | 25200 | 24800 | 24100 | 98 | 97 | 0.30 |
| Ex. 14 | 24200 | 23700 | 23200 | 98 | 98 | 0.40 |
| Ex. 15 | 26800 | 26400 | 26000 | 99 | 98 | 0.20 |
| Ex. 16 | 26500 | 26100 | 25800 | 98 | 99 | 0.30 |
| Ex. 17 | 25000 | 24500 | 24000 | 98 | 98 | 0.30 |
| Ex. 18 | 25900 | 25100 | 24300 | 97 | 97 | 0.30 |

Example 19

Into a 30 liter vessel-type reactor (SUS316L), there were charged 4,566 g (20.0 mol) of bisphenol A, 4,584 g (21.4 mol) of diphenyl carbonate containing 1 ppm or less of 2,2'-dihydroxybenzophenone and 10 ppm of phenyl 2-hydroxybenzoate (phenyl salicylate), and 0,022 g (0.001 mol) of trilithium nitrilotriacetate monohydrate. After substitution with nitrogen, the temperature was gradually raised. Once the reaction mixture was dissolved, agitation was started to initiate the polymerization. At this time the temperature in the vessel was 180° C. Thereafter, the temperature was further raised to 270° C. while the pressure was gradually reduced. The reaction was continued while the produced phenol was distilled out. Finally, the pressure in the vessel was held at 1 Torr. The total period of time for polymerization was 4 hours. After the vessel was restored to normal pressure, the polymer was extruded into a water bath and the extruded strands were cut into pellets. The polymer obtained had a viscosity average molecular weight of 15,500 and was colorless and transparent. The hue of "b" value was 0.22.

Example 20

The procedures of Example 19 were repeated except that diphenyl carbonate used contained 1 ppm or less of 2,2'-dihydroxybenzophenone and 60 ppm of phenyl 2-hydroxybenzoate. The polymer obtained had a viscosity average molecular weight of 17,100 and was colorless and transparent. The hue or "b" value was 0.40.

Example 21

The procedures of Example 19 were repeated except that diphenyl carbonate used contained 1 ppm or less of 2,2'-dihydroxybenzophenone and 90 ppm of phenyl 2-hydroxybenzoate. The polymer obtained had a viscosity average molecular weight of 17,700 and was colorless and transparent. The hue or "b" value was 0.70.

Example 22

The procedures of Example 19 were repeated except that the catalyst used was 0.28 g (0.001 mol) of trisodium nitrilotriacetate monohydrate. The polymer obtained had a viscosity average molecular weight of 15,700 and was colorless and transparent. The hue or "b" value was 0.25.

Example 23

The procedures of Example 19 were repeated except that the catalyst used was 0.37 g (0.001 mol) of disodium ethylenediaminetetraacetate dihydrate. The polymer obtained had a viscosity average molecular weight of 16,700 and was colorless and transparent. The hue or "b" value was 0.30.

Example 24

Into a 30 liter vessel-type reactor (SUS316L), there were charged 4,566 g (20.0 mol) of bisphenol A, 4,584 g (21.4 mol) of diphenyl carbonate containing 1 ppm or less of 2,2'-dihydroxybenzophenone and 10 ppm of phenyl 2-hydroxybenzoate, and 0.022 g (0.001 mol) of trilithium nitrilotriacetate monohydrate. After substitution with nitrogen, the temperature was gradually raised. Once the reaction mixture was dissolved, agitation was started to initiate the polymerization. At this time the temperature in the vessel was 180° C. Thereafter, the temperature was further raised to 270° C. while the pressure was gradually reduced. The reaction was continued while the produced phenol was distilled out. Finally, the pressure in the vessel was held at 1 Torr. The total period of time for polymerization was 4 hours. After the vessel was restored to normal pressure, the prepolymer was extruded into a water bath and the extruded strands were cut into pellets.

To 100 parts by weight of the prepolymer, 0.03 parts by weight of diphenyl phosphonate was added as a thermal stabilizer. The mixture was then molten in a twin-screw extruder at 270° C. and transferred to a lateral, bi-axial, self-cleaning high viscosity reactor (2 liter, 270° C., 0.2 Torr, 60 rpm). The molten polymer was drawn out with a gear pump at a rate of 2.5 kg/h. The retention time was 30 minutes. The polymer obtained had a viscosity average molecular weight of 26,800. The polymer was colorless and transparent corresponding to a "b" value of 0.32.

Comparative Example 4

The procedures of Example 19 were repeated except that diphenyl carbonate used contained 1 ppm or less of 2,2'-dihydroxybenzophenone and 200 ppm of phenyl 2-hydroxybenzoate. The polymer obtained has a viscosity average molecular weight of 16,600 and was yellowish corresponding to a "b" value of 6.70.

Example 25

Into a 30 liter vessel-type reactor, there were charged 4,566 g (20.0 mol) of bisphenol A, 4,584 g (21.4 mol) of diphenyl carbonate containing 10 ppm of 2,2'-dihydroxybenzophenone and 10 ppm of phenyl 2-hydroxybenzoate, and 0.022 g (0.001 mol) of trilithium nitrilotriacetate monohydrate. After substitution with nitrogen the temperature was gradually raised. Once the reaction mixture was dissolved, agitation was started to initiate the polymerization. At this time the temperature in the vessel was 180° C. Thereafter, the temperature was further raised to 270° C. while the pressure was gradually reduced. The reaction was continued while the produced phenol was distilled out. Finally, the pressure in the vessel was held at 1 Torr. The total period of time for polymerization was 4 hours. After the vessel was restored to normal pressure, the polymer was extruded into a water bath and the extruded strands were cut into pellets. The polymer obtained was colorless and transparent and had a viscosity average molecular weight of 16,700. The hue of "b" value was 0.10.

This polymer contained 15 ppm of 2,2'-dihydrobenzophenone and 7 ppm of phenyl 2-hydroxybenzoate.

Example 26

The procedures of Example 25 were repeated except that diphenyl carbonate used contained 60 ppm of 2,2'-dihydroxybenzophenone and 60 ppm of phenyl 2-hydroxybenzoate. The polycarbonate obtained has a viscosity average molecular weight of 15,800 and a "b" value of 0.30.

The polymer contained 80 ppm of 2,2'-dihydroxybenzophenone and 50 ppm of phenyl 2-hydroxybenzoate.

Example 27

The procedures of Example 25 were repeated except that diphenyl carbonate contained 10 ppm of 2,2'-dihydroxybenzophenone and 80 ppm of phenyl 2-hydroxybenzoate. The polycarbonate obtained has a viscosity average molecular weight of 17,200 and a "b" value of 0.20.

The polymer contained 30 ppm of 2,2'-dihydroxybenzophenone and 60 ppm of phenyl 2-hydroxybenzoate.

Comparative Example 5

The procedures of Example 25 were repeated except that diphenyl carbonate used contained 120 ppm of 2,2'-dihydroxybenzophenone and 120 ppm of phenyl 2-hydroxybenzoate. The polycarbonate obtained has a viscosity average molecular weight of 15,900 and a "b" value of 5.20.

The polymer contained 140 ppm of 2,2'-dihydroxybenzophenone and 100 ppm of phenyl 2-hydroxybenzoate.

Example 28

The procedures of Example 1 were repeated except that the catalyst was 0.0036 g ($2\times10^{-5}$ mol) of calcium acetate instead of trisodium nitrilotriacetate monohydrate. The polymer obtained had a viscosity average molecular weight of 26,500 and was substantially colorless corresponding to a "b" value of 0.70.

Example 29

The procedures of Example 1 were repeated except that the catalyst used was 0.0058 g ($2\times10^{-5}$ mol) of disodium phenylphosphate instead of trisodium nitrilotriacetate monohydrate. The polymer obtained had a viscosity average molecular weight of 28,200 and was substantially colorless corresponding to a "b" value of 0.75.

Example 30

The procedures of Example 1 were repeated except that the catalyst used was 0.00058 g ($2\times10^{-6}$ mol) of disodium phenylphosphate instead of trisodium nitrilotriacetate monohydrate. The polymer obtained had a viscosity average molecular weight of 27,400 and was substantially colorless corresponding to a "b" value of 0.65.

Example 31

The procedures of Example 1 were repeated except that the catalyst used was 0.0008 g ($2\times10^{-5}$ mol) of sodium hydroxide instead of trisodium nitrilotriacetate monohydrate. The polymer obtained had a viscosity average molecular weight of 26,900 and was substantially colorless corresponding to a "b" value of 0.80.

According to the process for preparing an aromatic polycarbonate resin of the present invention, any industrially widely used stainless steel reactor can be used to prepare a colorless, transparent, high molecular weight aromatic polycarbonate, for example, a polycarbonate suitable for extrusion molding. Further, the process does not need the use of a halogenated solvent, such as methylene chloride, and therefore no environmental pollution is caused.

What is claimed as new and desired to be secured by Letters Patent of the United States is:

1. In a process for preparing an aromatic polycarbonate resin from an aromatic dihydroxy compound and a carbonate diester by transesterification in the presence of transesterification catalyst, comprising reacting a carbonate diester with an aromatic dihydroxy compound, at a temperature of 140° to 280° C. and a reaction pressure of from 0.1 Torr to atmospheric pressure in the presence of a transesterification catalyst to form a polycarbonate prepolymer, the improvement comprising using a purified carbonate diester as said carbonate diester, said carbonate diester containing benzophenone and benzoate ester derivatives having a molecular weight of less than 1,000, each in an amount of 100 ppm or less, said polycarbonate prepolymer having a viscosity average molecular weight of 5,000 to 20,000 at a temperature of 140° to 280° C., the reaction pressure being from 0.1 Torr to normal pressure.

2. The process of claim 1, wherein said transesterification catalyst comprises an iminocarboxylic acid, or salt thereof, having in its molecule the moiety

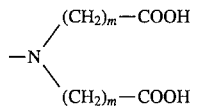 (7)

wherein m is an integer of 1 to 3.

3. The process of claim 1, wherein said transesterification catalyst comprises an iminocarboxylic acid, or salt thereof, having in its molecule the moiety:

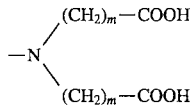 (7)

wherein m is an integer of 1 to 3.

4. The process of claim 3, wherein the amount of transesterification catalyst used is about $5\times10^{-6}$ to 1.0% by mole, based on the total amount of the aromatic dihydroxy compound.

5. The process of claim 3, wherein said transesterification catalyst is selected from the group consisting of iminodiacetic acid, iminodiacetic acid, nitrilotriacetic acid, nitrilotripropionic acid, ethylenediaminetetraacetic acid, ethylenediamine-tetrapropionic acid, propylenediaminetetraacetic acid, cyclohexanediaminetetraacetic acid, xylylenediaminetetraacetic acid, glycol ether diaminetetraacetic acid, diethylenetriaminepentaacetic acid and trimethylenetetraminehexaacetic acid, or a salt thereof.

6. The process of claim 1, wherein said transesterification catalyst is an alkali metal compound or alkaline earth metal compound.

7. The process of claim 1, wherein said transesterification catalyst is selected from the group consisting of calcium acetate, sodium hydroxide, cesium carbonate and disodium phenylphosphate.

8. The presence of claim 1, wherein the amount of transesterification catalyst used is about $1\times10^{-6}$ to $1\times10^{-3}$% by mole, based on the total amount of the aromatic dihydroxy compound.

9. The process of claim 3, wherein the purified carbonate diester is obtained by distillation of a crude carbonate diester containing benzophenone and benzoate ester derivatives under reduced pressure.

10. The process of claim 1, wherein the carbonate diester is diphenyl carbonate and the benzophenone derivative is 2,2'-dihydoxybenzophenone.

11. The process of claim 1, wherein the carbonate diester is diphenyl carbonate and the benzoate ester derivative is phenyl hydroxybenzoate.

12. The process of claim 1, wherein the amount of benzophenone derivative in the carbonate diester is 10 ppm or less.

13. The process of claim 1, wherein the amount of benzoate ester derivative in the carbonate diester is 10 ppm or less.

* * * * *